3,541,805
METHOD AND APPARATUS FOR VAPOR CONDENSATION
Romesh Kumar, Berkeley, Cary Judson King III, Kensington, and Arthur I. Morgan, Jr., Berkeley, Calif., assignors to the United States of America as represented by the Secretary of Agriculture
Filed Feb. 26, 1969, Ser. No. 802,456
Int. Cl. F26b *13/30;* F25c *1/00*
U.S. Cl. 62—66                                     2 Claims

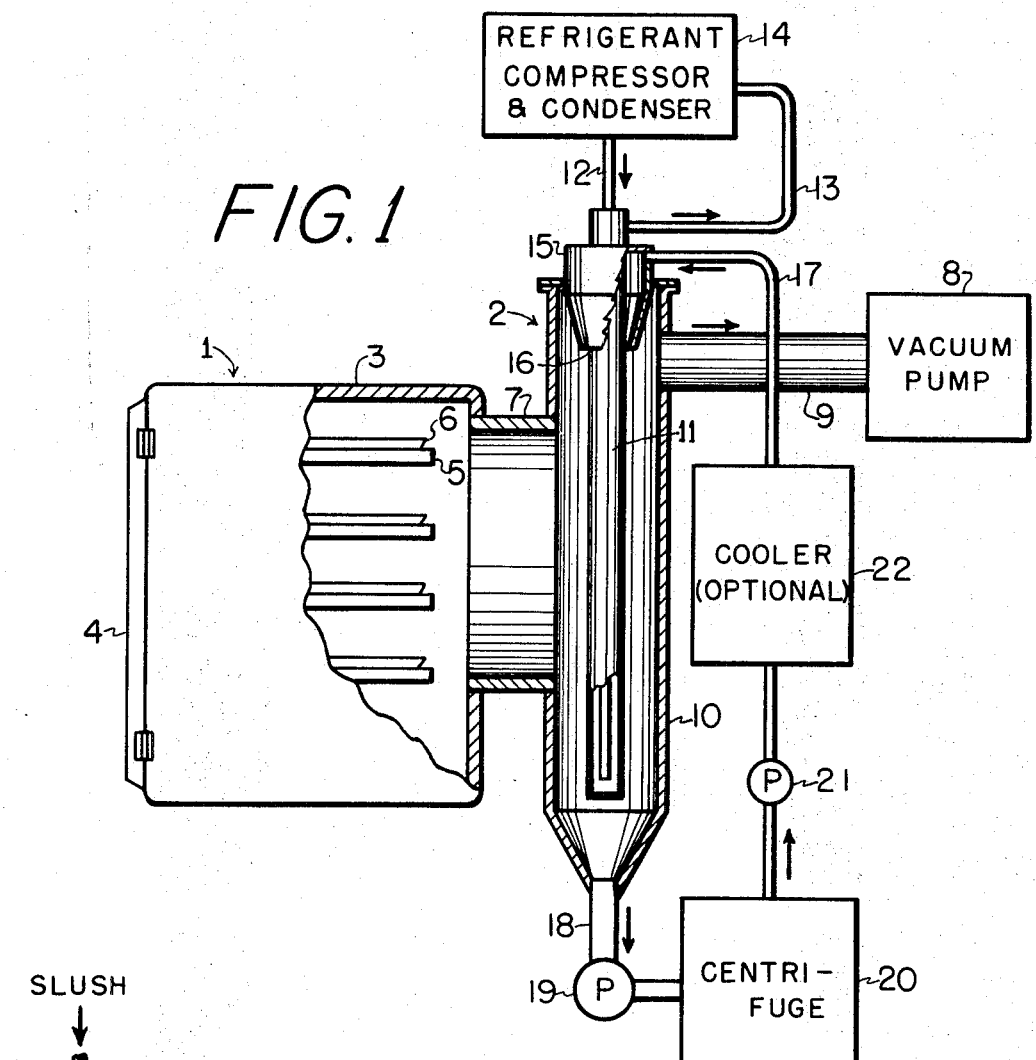
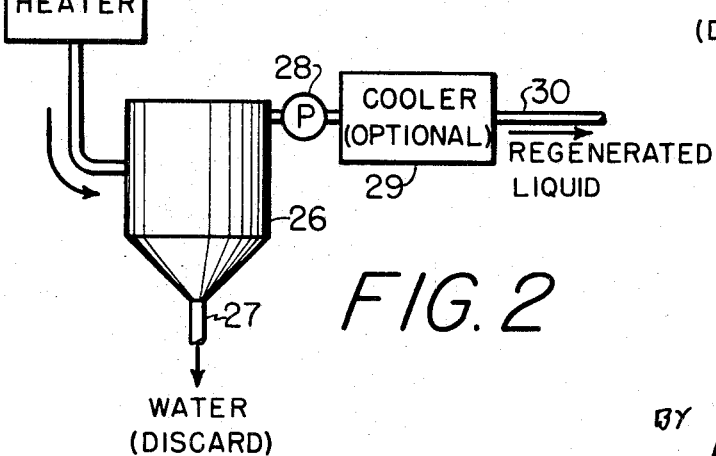
FIG. 1
FIG. 2
R. KUMAR, C.J. KING, III,
A.I. MORGAN, JR.
INVENTORS United States Patent Office 3,541,805
Patented Nov. 24, 1970

ABSTRACT OF THE DISCLOSURE

Systems for condensing water vapor which includes exposing the vapor to a refrigerated surface maintained at a temperature low enough to convert the vapor to ice, and concomitantly flowing a water-immiscible liquid over the refrigerated surface to sweep away the so-formed ice. The liquid is then centrifuged or filtered to remove ice, and is then cooled and recycled to the system.

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

This invention relates to and has among its objects the provision of novel process and apparatus for condensing vapors, especially for condensing water vapor. Further objects of the invention will be evident from the following description and the appended drawing.

In the drawing:

FIG. 1 is a schematic diagram, partly in cross-section, of one modification of apparatus for practice of the invention, particularly in conjunction with a freeze-drying operation.

FIG. 2 is a schematic diagram illustrating an alternative method for regenerating the condensing liquid.

The invention is of particular utility in conjunction with dehydration processes conducted under sub-atmospheric pressure, and its application in this area will be stressed in the description below by way of illustration but not limitation.

In dehydrating foods and other heat-sensitive materials it is often desirable to operate under sub-atmospheric pressure so that moisture can be evaporated at reduced temperatures whereby the essential attributes of the products—e.g., flavor, color, vitamin content, etc.—are preserved to a greater extent than in atmospheric drying processes. Operation at sub-atmospheric pressures, however, gives rise to the problem that every small unit volume of water which is evaporated yields an enormous volume of water vapor. This complicates the process in that the vacuum system must be capable of handling enormous volumes of vapor in order to maintain the desired pressure level. Various techniques are known and used for alleviating the situation. The simplest involves interposing a conventional condenser in the system whereby the vapors are contacted with a cold surface. Water vapor will condense on this cold surface and thus be removed from the gas phase. However, if the condenser is only cold enough to form liquid water, the atmosphere will still contain an excessive amount of water vapor. If the condenser is cold enough to form ice, more water vapor will be removed from the system; but, on the other hand, the cold surface rapidly loses its effectiveness as it becomes coated with a thicker and thicker coating of ice.

Another approach to the problem involves absorbing the water vapor in a water-miscible liquid—typically, ethylene glycol or an aqueous solution of a highly-soluble salt such as calcium or lithium chloride. In conventional applications of this absorption system the gas stream is passed through a tower where the gas is intimately contacted with the water-miscible liquid. The spent solution at the base of the tower, now diluted with water, is passed through an evaporator to distill off water; the concentrated liquid is then cooled and returned to the absorption tower. Although absorption systems provide better results than surface-condensing systems, they are subject to certain disadvantages. A major problem is that the effectiveness of the process hinges on diffusion of water vapor into the body of the absorbent liquid. Since this diffusion is a relatively slow process, the absorption equipment for a given dehydration unit must be very large to be capable of providing the desired result. Another item is that since the absorbent liquid is miscible with water, regeneration of the spent absorbent requires that the water be boiled out. This in turn requires considerable fuel, adding additional expense to what is already a costly procedure, both equipment- and operation-wise. A further item is that with a water-miscible absorbent, the characteristics thereof change as they absorb water. Thus for example, their ability to absorb more water decreases. Also, the freezing point of such liquids as brines will increase as more and more water is taken up. This means that the system cannot be used at very low temperatures (desirable to reduce residual water vapor to low levels) without running the danger that the absorbent liquid may solidify and plug up the entire system. A last item to be mentioned is that aqueous solutions of salts such as calcium and lithium chloride are often corrosive and cannot be used unless the equipment is constructed of special, expensive salt-resistant alloys.

The present invention has as its prime object the provision of means for surmounting the problems outlined above.

In the condensing system of the invention, the gaseous material containing water vapor is contacted with a condensing surface maintained at a temperature below 0° C. Concomitantly, a water-immiscible liquid is flowed over this surface. As a result when the vapor contacts the cold, liquid-coated surface it is converted into ice and this so-formed ice is swept away from the field of action by the continued flow of liquid. This scouring action is in sharp contrast to conventional cold-surface condensers which build up a thick coating of ice and thereby lose their efficiency. Moreover, by using a water-immiscible liquid, our system provides substantial advantages over absorption systems—i.e., those which employ water-miscible liquids such as glycol or aqueous salt solutions. A primary advantage of the invention in this respect is that it is not dependent on diffusion of vapor into a liquid; the surface of the water-immiscible liquid is utilized to convert the water vapor into ice on contact therewith. In other words, when the water vapor touches the surface of the water-immiscible liquid it is converted into ice; it is not necessary that the vapor enter into the body of liquid for the desired result to be attained. Because the system of the invention is independent of diffusion, it exhibits a high degree of efficiency of condensation so that the equipment is smaller and less costly than an absorption system capable of handling the same load. Another important advantage of the invention is that the spent liquid can be regenerated easily and cheaply. The slush (mixture of ice and liquid) formed in the condensation area is centrifuged or filtered, and the liquid recycled to the condensation area. This is in contrast to absorption systems wherein the spent absorbent liquid must be subjected to distillation to remove water.

A further advantage of the invention is that during the condensation cycle there is no change in the characteristics of the water-immiscible liquid—for example, the freezing point of the liquid remains the same as it was when it entered the system. This means that the process can be operated at low temperatures without danger of the liquid solidifying. A still further advantage of the invention is that the liquids used are not corrosive and thus may be used with equipment fabricated from the commoner and less expensive metals.

The condensing system of the invention may be applied in any situation where it is desired to remove water vapor from a gaseous medium. Typically, this may be in conjunction with an operation to dehydrate foods, biological materials, or the like. The dehydration may be one carried out at atmospheric pressure or it may be one carried out under vacuum and may, or may not, be one wherein the material being dehydrated is maintained in the frozen state. The invention is of particular advantage in freeze-drying procedures where continuous water vapor removal is required. By applying the condensing system of the invention to dehydration procedures, greatly improved efficiency is attained in that moisture is effectively and economically removed from the system.

A feature of the invention lies in the use of a special condensing liquid, namely, one which is water immiscible so that in operation it produces a slush—a mixture of ice crystals and liquid—in contrast to the homogenous solutions obtained with absorption systems. It is obvious that the liquid used in accordance with the invention be one which remains a liquid at the operating temperature. Of course, the operating temperature will vary depending on individual circumstances but in every case will be below 0° C. Thus a basic criterion is that the liquid have a freezing point below 0° C. Usually, it is preferred to operate at temperature well below 0° C. and in such case it follows that the liquid must be one which remains a liquid at the selected operating temperature. For example, in procedures—such as dehydrations—carried out at sub-atmospheric pressure, it is desirable to reduce the residual proportion of water vapor below that which corresponds to the vapor pressure of ice at the freezing point (about 4.6 mm. Hg). In such case the condensing liquid may be cooled sufficiently so that the ice is held at minus 40° C., which corresponds to a vapor pressure of only about 0.1 mm. Hg. Where such a technique is used it is evident that the condensing liquid must maintain its liquid state at this temperature of minus 40° C. It is also important that the condensing liquid be less volatile than water. Usually, it is preferred that the vapor pressure of the liquid be one-tenth or less that of water at the same temperature. In addition to having a low freezng point, it is preferred that the condensing liquid have a relatively low viscosity so that the ice crystals can be removed therefrom by centrifugation or filtration. A low viscosity is also desirable so that the liquid can be pumped easily, and so that it will form a thin film on the condenser surface.

In the event that the ice crystals are separated from the slush by filtration or other procedure independent of density considerations, the relative densities of the condensing liquid and water are immaterial, and one may employ a condensing liquid having the same density as water or a different density from that of water. Where, however, ice is to be separated by centrifugation or the like, the condensing liquid should be one that is either denser or less dense than ice. In an alternative method of regeneration, the slush is warmed and the resulting water is separated by settling from the liquid. Where such a technique of regeneration is used, the liquid selected should have a density less than, or greater than, that of water.

Examples of substances which may be used as the condensing liquid in accordance with the invention are listed below by way of illustration and not limitation. Ordinarily, it is preferred to employ mixtures—for example, mixtures of homologues, isomers or both homologues and isomers—since they will exhibit lower freezing points than the corresponding individual compounds.

Hydrocarbons such as n-decane, isopropylbenzene, n-butylbenzene, 1,2,3-trimethylbenzene, tetralin (1,2,3,4-tetrahydronaphthalene), Decalin (decahydronaphthalene), and the like. As above noted, mixtures of homologues and isomers are generally preferred, and, for example, we have attained especially good results with the following liquid: A commercially-available mixture of $C_9$–$C_{10}$ hydrocarbons, chiefly isomeric alkylated benzenes, and having a boiling range of 317–335° F. In addition to being water- and ice-immiscible, this liquid exhibits low volatility and remains a liquid at temperatures as low as minus 78° C. Other of its characteristics are tabulated below:

| Temperature, ° C.: | Viscosity, centipoises | Density, g./cc. |
|---|---|---|
| 20 | 0.85 | 0.871 |
| 0 | 1.15 | 0.887 |
| −20 | 1.6 | 0.903 |
| −40 | 2.3 | 0.919 |

Other substances which may be employed, preferably in the form of mixtures of hamologues and/or isomers, are caprylonitrile, di-n-hexyl ether, n-hexanol, a commercially available mixture of isomeric perfluoro-dimethyl-cyclohexanes, and various silicone fluids, typically the commercially-available silicone fluid having a viscosity of 0.65 centistokes and the structure

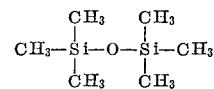

Reference is now made to FIG. 1 which illustrates apparatus embodying the principles of the invention, and used by way of example for condensing water vapor evolved in a freeze-drying operation.

The apparatus includes a freeze-drying unit gradually designated as 1, a condenser unit generally designated as 2.

Freeze-drying unit 1 includes a chamber 3 provided with a vacuum-tight door 4. Within chamber 3 are a series of shelves 5 of hollow construction so that a heating medium such as steam or hot water can be circulated through them to provide the heat required for sublimation of ice from the material undergoing dehydration.

The food or other material to be dehydrated (in a frozen condition) is contained in trays 6 supported on shelves 5.

For evacuating the system there is provided a vacuum pump 8 which communicates with chamber 3 via duct 7, casing 10, and duct 9.

In carrying out a run, door 4 is opened and trays 6 carrying pieces of frozen food or other material to be dried are slid into place on shelves 5. Door 4 is then sealed and chamber 3 is evacuated by operation of pump 8, the vacuum being maintained during the dehydration run. Concomitantly, a heating medium is circulated through shelves 5 to provide the heat of sublimation, that is, the conversion of ice in the particles of food into water vapor. During the operation, water vapor and fixed gases pass through duct 7 into casing 10 wherein water vapor is condensed as explained below.

Condenser unit 2 includes a casing 10 in which is disposed a refrigerant evaporator unit 11. A conventional refrigerant liquid such as "Freon-12" or liquid $NH_3$ is fed into unit 11 via pipe 12 whereby it evaporates and cools said unit. The evaporated refrigerant leaves via pipe 13 and is directed to compressor 14 wherein it is raised to a higher pressure, cooled so as to re-liquefy it, and then returned to evaporator 11. In typical operations, refrigerating unit 11 is maintained at about minus 20° to minus 70° C. As explained below, unit 11 provides the major refrigeration effect required for converting into ice the water vapor evolved in the freeze-drying operation.

At the top of casing 10 is disposed feed unit 15, which forms with unit 11 an annular orifice 16. Water-immiscible liquid introduced into feed unit 15 via pipe 17, flows out via orifice 16, forming a constantly-replenished sheet of the liquid about refrigerating unit 11. During the downward passage of this sheet of liquid, it is cooled on its inner surface by contact with unit 11, and exposed on its outer surface to the gas arriving from duct 7 and circulating through casing 10. Water vapor present in this gas deposits as ice on the outer surface of the liquid and is carried therewith to the base of casing 10 and into pipe 18. The resulting slush of ice and liquid is directed by pump 19 into centrifuge 20 wherein the slush is separated into its components of ice and liquid. The separated liquid is directed by pump 21 through cooler 22 wherein its temperature is reduced to below 0° C., and the cooled liquid is then directed into pipe 17 for recirculation in the condensation process. Optionally, cooler 22 is not used. In such case the liquid is conveyed by pump 21 directly into pipe 17 for recirculation in the condensation process.

It may be noted that as the water-immiscible liquid flows along the surface of refrigeration unit 11 it is not heated; it is constantly being kept at the requisite sub-freezing temperature by its contact with unit 11. Of course, some degree of warning will take place after the liquid leaves casing 10, particularly during passage through pumps 19 and 21 and through centrifuge 20. Thus cooler 22 is provided merely to abstruct the heat added to the liquid after it leaves casing 10. In other words cooler 22 does not contribute to abstracting heat in the condensation step per se. Indeed, cooler 22 may be omitted, in which case the recycled liquid will cool rapidly upon contacting unit 11.

It is acknowledged that the prior art (Thuse, U.S. Pat. 3,132,929) discloses a system wherein a water-immiscible liquid is sprayed as a free-falling curtain of liquid into a freeze-drying chamber to condense evolved water vapor. In this known procedure, the falling liquid is used as the refrigerant to cause the conversion of water vapor to ice. Moreover, since the liquid in carrying out this refrigeration function is introduced as a liquid and leaves the system as a liquid, one utilizes only a change in the *sensible* heat of the liquid. Opposed to this is the fact that conversion of water vapor to ice involves a change of state—a process requiring abstruction of *latent* heat. This means that the known process operates under a major disadvantage because by relying on a change in sensible heat, the amount of heat which can be absorbed per unit weight of liquid is very low. This situation can best be illustrated by the following:

The conversion of 1 lb. of water vapor to ice requires removal of approximately 1200 B.t.u. If this much heat is to be taken up by a liquid without change in its state, we have the heat balance—

$$1200 = c \times m \times dT$$

wherein $c$ is the heat capacity of the liquid
$m$ is the mass of the liquid
$dT$ is the temperature change of the liquid.

Assuming that the liquid increases 10° F. in temperature and that it has a heat capacity of 0.5 B.t.u./lb. ° F., one can readily determine $m$ as being 240 lbs. This means that for every pound of water vapor to be condensed, one must pump 240 lbs. of water-immiscible liquid through the system.

Consider on the other hand the situation in accordance with the present situation wherein the water-immiscible liquid functions only to scour the condensing surface and the refrigeration is effected by a conventional refrigerant (such as liquid ammonia) which changes in state (evaporates). In this case the heat balance is represented by the equation—

$$1200 = m \times H$$

wherein $m$ is the mass of ammonia
$H$ is the heat of vaporization of ammonia (i.e., 590 B.t.u./lb.).

In this case $m$ turns out to approximately 2. In other words, to condense 1 lb. of water vapor one must evaporate only 2 lbs. of liquid ammonia. The amount of water-immiscible liquid to be pumped is considerably less, being only that amount necessary to wet the metallic surface fully.

It is thus obvious that the present invention, by using a change in state of a refrigerant to cause a change in state of the water vapor, attains a substantial advantage over the Thuse system wherein a change in sensible heat of the water-immiscible liquid is utilized to effectuate the change in state of the water vapor.

Reference is now made to FIG. 2 which illustrates an alternative system for regenerating the condensing liquid. In this scheme, the slush from the condenser unit is pumped through heat exchanger 25 wherein it is heated just enough to melt the ice. The material is then introduced into settling tank 26 wherein the material separates into two layers—an upper layer of the water-immiscible liquid and a lower layer of water. The latter is drawn off through pipe 27. The liquid is directed by pump 28 through cooler 29 wherein its temperature is reduced to below 0° C., and is then directed by pipe 30 back to the condenser unit. It is, of course, obvious that if the condensing liquid is one which is denser than water, the piping would be re-arranged so that the upper (water) layer would be sent to discard, and the lower (condensing liquid) layer would be pumped to cooler 29 and pipe 30.

Optionally cooler 29 is omitted; in such case the liquid is pumped directly from pump 28 through pipe 30 back to the condenser unit. In this event, the recycled liquid is quickly cooled upon contact with refrigeration unit 11.

In FIG. 1 we have illustrated application of our condensing system to a conventional batch-type freeze-drier. It will be obvious, however, that our condensing systems can be applied to continuous freeze-driers. Such application is of special advantage in that the total system can be operated continuously without necessity for removing encrusted ice as would be the case were one to use a conventional cold surface condenser. In this embodiment of the invention, our condensing system can be advantageously employed in conjunction with the continuous freeze-drier of William C. Rockwell et al., U.S. Pat. 3,303,578.

Having thus described the invention, what is claimed is:

1. A process for condensing and removing water vapor which comprises:
   applying the said vapor against one side of a solid condensing surface while concomitantly flowing a continuously-replenished sheet of water-immiscible liquid downwardly thereover,
   evaporating a refrigerant on the opposite side of the said surface to abstract heat from the vapor and convert it into ice, which ice is carried by the flow of liquid downwardly along the first-mentioned side of the condenser surface,
   collecting the resulting slush of ice and water-immiscible liquid, separating the ice therefrom, and recycling the ice-free liquid by flowing it downwardly over the first-mentioned side of the condenser surface,
   wherein the water-immiscible liquid is a mixture of $C_9$–$C_{10}$ hydrocarbons, consisting chiefly of alkylated benzenes, and having a boiling range of 317–335° F.

2. A process for condensing and removing water vapor which comprises:
   applying the said vapor against one side of a solid condensing surface while concomitantly flowing a continuously-replenished sheet of water-immiscible liquid downwardly thereover, evaporating a refrigerant on the opposite side of the said surface to abstract heat from the vapor and convert it into ice, which ice is carried by the flow of liquid downwardly along the first-mentioned side of the condenser surface, collecting the resulting slush of ice and water-immiscible liquid, separating the ice therefrom, and recycling the ice-free liquid by flowing it downwardly over the first-mentioned side of the condenser surface, wherein the vapor is under sub-atmospheric pressure and the water-immiscible liquid is a mixture of $C_9$-$C_{10}$ hydrocarbons, consisting chiefly of alkylated benzenes, and has a boiling range of 317–335° F.

References Cited

UNITED STATES PATENTS

| | | | |
|---|---|---|---|
| 2,097,851 | 11/1937 | Wenzl | 62—282 |
| 2,613,513 | 10/1952 | Shields | 62—66 |
| 2,716,068 | 8/1955 | Fain | 103—13 |
| 3,132,929 | 5/1964 | Thuse | 34—92 |
| 3,169,381 | 2/1965 | Persson | 62—282 |

WILLIAM J. WYE, Primary Examiner

U.S. Cl. X.R.

34—92; 62—82, 282